(12) United States Patent
Chae et al.

(10) Patent No.: US 10,341,170 B2
(45) Date of Patent: Jul. 2, 2019

(54) METHOD FOR DIAGNOSING LINK STATUS IN NETWORK

(71) Applicant: Hyundai Motor Company, Seoul (KR)

(72) Inventors: Jun Byung Chae, Seoul (KR); Jin Hwa Yun, Seoul (KR); Jeong Seok Han, Gyeonggi-Do (KR); Kang Woon Seo, Seoul (KR); Dong Ok Kim, Gyeonggi-Do (KR); Sang Woo Yu, Seoul (KR)

(73) Assignee: Hyundai Motor Company, Seoul (KR)

( * ) Notice: Subject to any disclaimer, the term of this patent is extended or adjusted under 35 U.S.C. 154(b) by 16 days.

(21) Appl. No.: 15/435,461

(22) Filed: Feb. 17, 2017

(65) Prior Publication Data

US 2017/0250858 A1    Aug. 31, 2017

(30) Foreign Application Priority Data

Feb. 26, 2016  (KR) .......................... 10-2016-0023728

(51) Int. Cl.
| | |
|---|---|
| H04L 29/06 | (2006.01) |
| H04L 12/801 | (2013.01) |
| H04B 1/50 | (2006.01) |
| H04L 12/24 | (2006.01) |
| H04L 12/40 | (2006.01) |
| H04L 12/26 | (2006.01) |

(52) U.S. Cl.
CPC .......... H04L 41/0686 (2013.01); H04L 12/40 (2013.01); H04L 43/0805 (2013.01); H04L 2012/40273 (2013.01)

(58) Field of Classification Search
CPC .................. H04L 41/0686; H04L 43/0805
See application file for complete search history.

(56) References Cited

U.S. PATENT DOCUMENTS

| | | | |
|---|---|---|---|
| 2006/0221843 A1* | 10/2006 | Cidon ..................... | H04L 43/50 370/248 |
| 2009/0262643 A1* | 10/2009 | Zhao ...................... | H04L 12/423 370/217 |
| 2009/0310517 A1* | 12/2009 | Narayanan .............. | H04L 67/16 370/254 |
| 2011/0013522 A1* | 1/2011 | Kishigami .............. | H04L 12/12 370/242 |
| 2012/0019404 A1* | 1/2012 | Brosio ................... | F02D 35/0007 341/112 |
| 2012/0303348 A1* | 11/2012 | Lu ......................... | G05B 23/0235 703/13 |
| 2013/0066514 A1* | 3/2013 | Das ........................ | G07C 5/008 701/31.5 |

(Continued)

*Primary Examiner* — Faruk Hamza
*Assistant Examiner* — Abusayeed M Haque
(74) *Attorney, Agent, or Firm* — Mintz Levin Cohn Ferris Glovsky and Popeo, P.C.; Peter F. Corless (57) ABSTRACT

Disclosed are link status diagnostic methods for a vehicle network. A link status diagnostic method performed in a communication node includes: identifying a type of a fault occurring in a link connected to the communication node; generating a signal including a link fault type indicator indicating the type of the fault; and transmitting the signal. Also, the signal is generated and transmitted according to an auto negotiation protocol. Therefore, stability and reliability of the vehicle network can be enhanced, thereby improving overall performance of the vehicle network.

17 Claims, 5 Drawing Sheets

(56) References Cited

U.S. PATENT DOCUMENTS

2014/0288728 A1\* 9/2014 Tsuchida ............. G06F 11/0739
                                                    701/1
2016/0104329 A1\* 4/2016 Sundareswara ....... G01M 17/00
                                                    701/33.9

\* cited by examiner

FIG. 8 ional Patent Application No. 10-2016-0023728, filed on
METHOD FOR DIAGNOSING LINK STATUS IN NETWORK

CROSS-REFERENCE TO RELATED APPLICATION

This application claims the benefit of and priority to Korean Patent Application No. 10-2016-0023728, filed on Feb. 26, 2016 in the Korean Intellectual Property Office (KIPO), the entirety of which is incorporated by reference as if fully set forth herein.

BACKGROUND

1. Technical Field

The present disclosure relates generally to methods for diagnosing a link status, and more specifically, to methods for diagnosing a status of a link between communication nodes in a vehicle network.

2. Description of the Related Art

The number and variety of electronic devices installed within a vehicle have been increasing significantly along with the recent digitalization of vehicle parts. Electronic devices may currently be used throughout the vehicle, such as in a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices comprising each of these systems are connected via the vehicle network, which supports functions of the electronic devices. For instance, the CAN may support a transmission rate of up to 1 Mbps and may support automatic retransmission of colliding messages, error detection based on a cycle redundancy interface (CRC), or the like. The FlexRay-based network may support a transmission rate of up to 10 Mbps and may support simultaneous transmission of data through two channels, synchronous data transmission, or the like. The MOST-based network is a communication network for high-quality multimedia, which may support a transmission rate of up to 150 Mbps.

Meanwhile, the telematics system, the infotainment system, as well as enhanced safety systems of a vehicle require higher transmission rates and system expandability. However, the CAN, FlexRay-based network, and the like may not sufficiently support such requirements. The MOST-based network, in particular, may support a higher transmission rate than the CAN and the FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps.

In a vehicle network where a first electronic device is connected with a second electronic device, errors may occur causing incorrect communications between the first electronic device and the second electronic device. Errors in communication may be the result of various faults such as a port fault of the first electronic device, a port fault of the second electronic device, a disconnection fault of a link between the first electronic device and the second electronic device, as well as unknown faults. Therefore, methods for identifying a link status and notifying other electronic device of the identified link status are needed.

SUMMARY

The present disclosure provides auto negotiation protocol based methods for diagnosing a link status.

In accordance with embodiments of the present disclosure, a method for diagnosing a link status, performed in a communication node of a vehicle network includes: identifying a type of a fault occurring in a link connected to the communication node; generating a signal including a link fault type indicator indicating the type of the fault; and transmitting the signal. Also, the signal may be generated and transmitted according to an auto negotiation protocol.

The type of the fault may be one of an unknown fault, a port fault in a local communication node, a port fault in a remote communication node, and a link disconnection fault.

The signal may further include a base page, and the link fault type indicator may be included in the base page.

The signal may further include an identifier of a second communication node connected to the link in which the fault occurs.

Also, the identifier may include at least one of a physical address and a medium access control (MAC) address of the second communication node.

The signal may further include capability information of the communication node.

The signal may be transmitted in a broadcast manner.

Further, in accordance with embodiments of the present disclosure, a method for diagnosing a link status, performed in a communication node of a vehicle network includes: identifying a type of a fault occurring in a link connected to the communication node; transmitting a first signal including a first indicator indicating an existence of the link in which the fault occurs; and transmitting a second signal including a second indicator indicating the type of the fault. Also, the first signal and the second signal may be transmitted according to an auto negotiation protocol.

The first signal may further include a base page, and the first indicator may be included in the base page.

The first signal may further include a third indicator indicating transmission of the second signal, and the second signal may further include a next page.

The type of the fault may be one of an unknown fault, a port fault in a local communication node, a port fault in a remote communication node, and a link disconnection fault.

The second signal may further include a next page, and the second indicator may be included in the next page.

The second signal may further include an identifier of a second communication node connected to the link in which the fault occurs.

Further, in accordance with embodiments of the present disclosure, a method for diagnosing a link status, performed in a communication node of a vehicle network includes: identifying a type of a fault occurring in a link connected to the communication node in an auto negotiation procedure based on an auto negotiation protocol; generating a medium access control (MAC) frame including a first indicator indicating the type of the fault; and transmitting the MAC frame.

The type of the fault may be one of an unknown fault, a port fault in a local communication node, a port fault in a remote communication node, and a link disconnection fault.

The MAC frame may further include an identifier of a second communication node connected to the link in which the fault occurs.

The MAC frame may further include a second indicator indicating a result of the auto negotiation procedure.

The MAC frame may be transmitted in a broadcast manner.

According to embodiments of the present disclosure, the type of fault occurring in a link can be identified during an auto negotiation procedure, and information about the type of fault in the link can be notified to other communication nodes via pulse signals or a MAC frame. Meanwhile, in the case that communication nodes supporting only layer-2 (L2) functions (e.g., L2 switches) are used in a vehicle network, it may be difficult for the layer-2 communication nodes to diagnose a link status (e.g., status of a physical connection). However, using the auto negotiation methods according to the present disclosure, the link status can be diagnosed easily. Therefore, stability and reliability of the vehicle network can be enhanced, thereby improving overall performance of the vehicle network.

BRIEF DESCRIPTION OF DRAWINGS

Embodiments of the present disclosure will become more apparent by describing in detail embodiments of the present disclosure with reference to the accompanying drawings, in which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Although embodiments are described herein as using a plurality of units to perform the exemplary process, it is understood that the exemplary processes may also be performed by one or plurality of modules. Additionally, it is understood that the term controller/controller unit/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Further, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, embodiments of the present disclosure will be described in detail with reference to the accompanying drawings. In describing the embodiments, to facilitate the entire understanding of the disclosure, like numbers refer to like elements throughout the description of the figures and the repetitive description thereof will be omitted.

Figure 1:
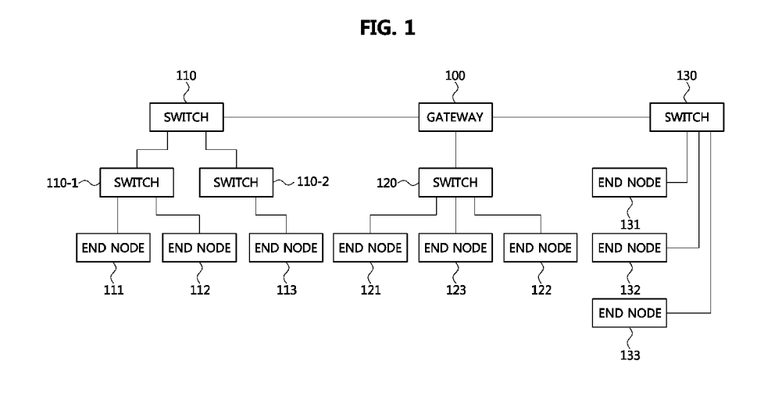
FIG. 1 is a diagram showing a vehicle network topology according to embodiments of the present disclosure.

FIG. 1 is a diagram showing a vehicle network topology according to embodiments of the present disclosure.

As shown in FIG. 1, a communication node included in the vehicle network may be a gateway, a switch (or bridge), or an end node. The gateway 100 may be connected with at least one switch 110, 110-1, 110-2, 120, and 130 and may be configured to connect different networks. For example, the gateway 100 may support connection between a switch which supports a controller area network (CAN) (e.g., FlexRay, media oriented system transport (MOST), or local interconnect network (LIN)) protocol and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of end nodes 111, 112, 113, 121, 122, 123, 131, 132, and 133 connected to the switch.

The end nodes 111, 112, 113, 121, 122, 123, 131, 132, and 133 may include an electronic control unit (ECU) configured to control various types of devices mounted within a vehicle. For example, the end nodes 111, 112, 113, 121, 122, 123, 131, 132, and 133 may include the ECU included in an infotainment device (e.g., a display device, a navigation device, and an around view monitoring device).

The communication nodes (e.g., a gateway, a switch, an end node, or the like) included in the vehicle network may be connected in a star topology, a bus topology, a ring topology, a tree topology, a mesh topology, or the like. In addition, the communication nodes of the vehicle network may support the CAN protocol, the FlexRay protocol, the MOST protocol, the LIN protocol, or the Ethernet protocol. Embodiments of the present disclosure may be applied to the foregoing network topologies. The network topology to which embodiments of the present disclosure may be applied is not limited thereto and may be configured in various ways.

Figure 2:
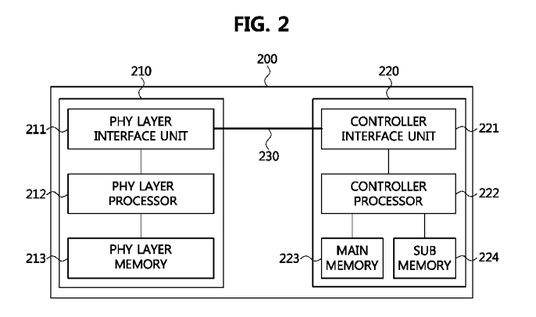
FIG. 2 is a diagram showing a communication node constituting a vehicle network according to embodiments of the present disclosure.

FIG. 2 is a diagram showing a communication node constituting a vehicle network according to embodiments of the present disclosure. Notably, the various methods discussed herein below may be executed by a controller having a processor and a memory.

As shown in FIG. 2, a communication node 200 of a network may include a PHY layer unit 210 and a controller unit 220. In addition, the communication node 200 may further include a regulator (not shown) for supplying power. In particular, the controller unit 220 may be implemented to include a medium access control (MAC) layer. A PHY layer unit 210 may be configured to receive or transmit signals from or to another communication node. The controller unit 220 may be configured to control the PHY layer unit 210 and perform various functions (e.g., an infotainment function, or the like). The PHY layer unit 210 and the controller unit 220 may be implemented as one system on chip (SoC), or alternatively may be implemented as separate chips.

Further, the PHY layer unit 210 and the controller unit 220 may be connected via a media independent interface (MII) 230. The MII 230 may include an interface defined in the IEEE 802.3 and may include a data interface and a management interface between the PHY layer unit 210 and the controller unit 220. One of a reduced MII (RMII), a gigabit MII (GMII), a reduced GMII (RGMII), a serial GMII (SGMII), and a 10 GMII (XGMII) may be used instead of the MII 230. A data interface may include a transmission channel and a reception channel, each of which may have an independent clock, data, and a control signal. The management interface may include a two-signal interface, one signal for the clock and one signal for the data.

Particularly, the PHY layer unit 210 may include a PHY layer interface unit 211, a PHY layer processor 212, and a PHY layer memory 213. The configuration of the PHY layer unit 210 is not limited thereto, and the PHY layer unit 210 may be configured in various ways. The PHY layer interface unit 211 may be configured to transmit a signal received from the controller unit 220 to the PHY layer processor 212 and transmit a signal received from the PHY layer processor 212 to the controller unit 220. The PHY layer processor 212 may be configured to execute operations of the PHY layer interface unit 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller unit 220 may be configured to monitor and control the PHY layer unit 210 using the MII 230. The controller unit 220 may include a controller interface unit 221, a controller processor 222, a main memory 223, and a sub memory 224. The configuration of the controller unit 220 is not limited thereto, and the controller unit 220 may be configured in various ways. The controller interface unit 221 may be configured to receive a signal from the PHY layer unit 210 (e.g., the PHY layer interface unit 211) or an upper layer (not shown), transmit the received signal to the controller processor 222, and transmit the signal received from the controller processor 222 to the PHY layer unit 210 or upper layer. The controller processor 222 may further include an independent memory control logic or an integrated memory control logic for controlling the controller interface unit 221, the main memory 223, and the sub memory 224. The memory control logic may be implemented to be included in the main memory 223, and the sub memory 224 may be implemented to be included in the controller processor 222.

Further, each of the main memory 223 and the sub memory 224 may be configured to store a signal processed by the controller processor 222 and may be configured to output the stored signal based on a request from the controller processor 222. The main memory 223 may be a volatile memory (e.g., a random access memory (RAM)) configured to temporarily store data required for the operation of the controller processor 222. The sub memory 224 may be a non-volatile memory in which an operating system code (e.g., a kernel and a device driver) and an application program code for performing a function of the controller unit 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

A method performed by a communication node and a corresponding counterpart communication node in a vehicle network will be described below. Although the method (e.g., signal transmission or reception) performed by a first communication node will be described below, the method is applicable to a second communication node that corresponds to the first communication node. In other words, when an operation of the first communication node is described, the second communication node corresponding thereto may be configured to perform an operation that corresponds to the operation of the first communication node. Additionally, when an operation of the second communication node is described, the first communication node may be configured to perform an operation that corresponds to an operation of a switch.

Figure 3:
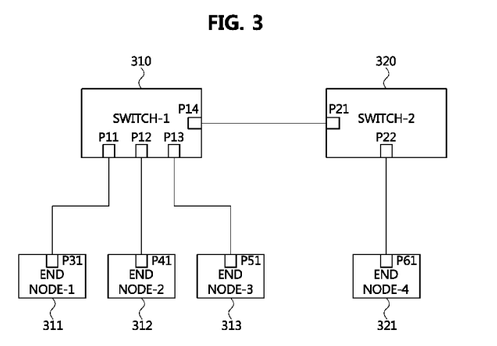
FIG. 3 is a diagram showing a vehicle network topology according to embodiments of the present disclosure.
Figure 4:
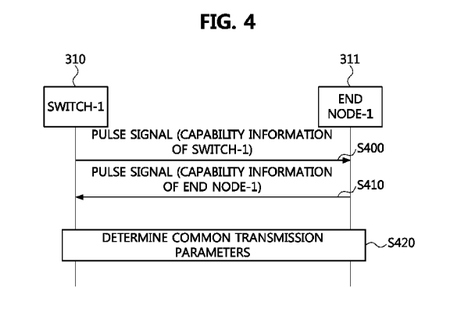
FIG. 4 is a sequence chart illustrating an auto negotiation method in a vehicle network.

FIG. 3 is a diagram showing a vehicle network topology according to embodiments of the present disclosure, and FIG. 4 is a sequence chart illustrating an auto negotiation method in a vehicle network.

As shown in FIGS. 3 and 4, switches 310 and 320, and end nodes 311, 312, 313, and 321 may constitute a vehicle network. Each of the switches 310 and 320 and the end nodes 311, 312, 313, and 321 may be identical to or similar with the communication node 200 explained with reference to FIG. 2. The switches 310 and 320 and the end nodes 311, 312, 313, and 321 may support an IEEE 802.3bp standard. Therefore, the switches 310 and 320 and the end nodes 311, 312, 313, and 321 may support an auto negotiation protocol defined according to the IEEE 802.3bp standard. In this case, each PHY layer unit of the switches 310 and 320 and the end nodes 311, 312, 313, and 321 may comprise an auto negotiation sublayer, and an auto negotiation method may be performed in each PHY layer unit.

The switch 310 may be connected with the end node 311, and a link may be formed between a port P11 and a port P31. The switch 310 may also be connected with the end node 312, and a link may be formed between a port P12 and a port P41. The switch 310 may also be connected with the end node 313, and a link may be formed between a port P13 and a port P51. The switch 310 may be connected with the switch 320, and a link may be formed between a port P14 and a port P21. The switch 320 may be connected with the end node 321, and a link may be formed between a port P22 and a port P61.

Once the vehicle network is formed (e.g., when a power is applied to the vehicle network, or when a battery is connected to the vehicle network), a communication node may perform an auto negotiation with a counterpart communication node based on an auto negotiation protocol. For example, auto negotiation procedures between the switch 310 and the end node 311, between the switch 310 and the end node 312, between the switch 310 and the end node 313, between the switch 310 and the switch 320, and between the switch 320 and the end node 321 may be performed. Through the auto negotiation procedures, common transmission parameters for the communication nodes may be determined. The common transmission parameters may be used for communications between the communication nodes. The common transmission parameters may include speed (e.g., transmission speed), duplex mode (e.g., half-duplex mode, full-duplex mode, etc.) and the like.

In the below description, only the auto negotiation between the switch 310 and the end node 311 will be explained. However, auto negotiation procedures between other communication nodes may also be performed identically or similarly.

First, the switch 310 may generate a pulse signal. The pulse signal may be encoded in a differential encoding (for example, difference Manchester encoding (DME)) manner. The pulse signal may be one of a link integrity test (LIT) pulse signal, a normal link pulse (NLP) signal, a fast link pulse (FLP) signal, etc. The pulse signal may include at least one data word. The data word may be referred to as a link code word (LCW), and a first LCW may be referred to as a base LCW. Also, the LCW may be referred to as a "page," and accordingly the base LCW may also be referred to as a base page.

The pulse signal (i.e., the page of the pulse signal) may include capability information of the switch 310. The capability information may be information on transmission speeds (e.g., maximum transmission speed) or duplex modes which are supported by the switch 310. Also, the pulse signal (i.e., the page of the pulse signal) may include remote fault information. The remote fault information may be represented with 1 bit. In a case that the value of the remote fault information is configured as '0', this may indicate that a remote fault has not been detected. In a case that the value of the remote fault information is configured as '1', this may indicate that a remote fault has been detected. For example, if the switch 310 receives a frame or a pulse signal for a predetermined time duration, the switch 310 may identify that the remote fault has not occurred, and set the value of the remote fault information to '0'. On the contrary, if the switch 310 does not receive a frame or a pulse signal for a predetermined time duration, the switch 310 may identify the remote fault has occurred, and set the value of the remote fault information to '1'.

The switch 310 may transmit the pulse signal including the capability information and the remote fault information (S400). The pulse signal may be transmitted to the end node 311 through the port P11. Also, a plurality of pulse signals may constitute a single burst signal, and the burst signal may be transmitted periodically or aperiodically.

The end node 311 may receive the pulse signal of the switch 310 through the port P31. The end node 311 may obtain the capability information of the switch 310 from the pulse signal, and identify the transmission speeds and/or the duplex modes supported by the switch 310 based on the obtained capability information. Also, the end node 311 may generate a pulse signal including its capability information. The capability information may be information on transmission speeds (e.g., maximum transmission speed) or duplex modes which are supported by the end node 311. Also, the pulse signal (i.e., the page of the pulse signal) may include remote fault information.

The end node 311 may transmit the pulse signal including the capability information and the remote fault information (S410). The pulse signal may be transmitted to the switch 310 through the port P31. Also, a plurality of pulse signals may constitute a single burst signal, and the burst signal may be transmitted periodically or aperiodically. Here, the step S410 was explained as performed after the step S400. However, sequence of the steps may not be restricted to the above example. For example, the step S410 may be performed before the step S400, or performed simultaneously with the step S400.

The switch 310 may receive the pulse signal of the end node 311 through the port P11. The switch 310 may obtain the capability information of the end node 311 from the pulse signal, and identify the transmission speeds and/or the duplex modes supported by the end node 311 based on the obtained capability information.

The switch 310 and the end node 311 may determine common transmission parameters based on the capability information (S420). The capability having the highest priority, among capabilities common for the switch 310 and the end node 311, may be determined as the common transmission parameter. For example, among transmission speeds supported by the switch 310 and transmission speeds supported by the end node 311, the highest common transmission speed may be determined as the common transmission parameter. Also, in a case that both of full-duplex mode and half-duplex mode are supported by the switch 310 and the end node 311, full-duplex mode may be determined as the common transmission parameter. Also, in a case that both of full-duplex mode and half-duplex mode are supported by the switch 310 and only half-duplex mode is supported by the end node 311, half-duplex mode may be determined as the common transmission parameter.

Hereinafter, auto negotiation protocol based link status diagnostic methods according to present disclosure will be descried.

Figure 5:
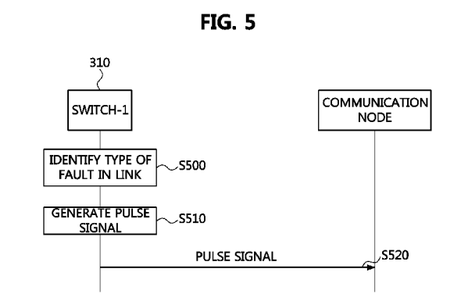
FIG. 5 is a sequence chart illustrating an auto negotiation protocol based method for diagnosing a link status according to a first exemplary embodiment of the present disclosure.

FIG. 5 is a sequence chart illustrating an auto negotiation protocol based method for diagnosing a link status according to a first exemplary embodiment of the present disclosure.

As shown in FIG. 5, a switch 310 and a communication node may constitute a vehicle network explained with reference to FIG. 3. The switch 310 may be identical to or similar with the switch 310 in FIG. 3. The communication node may be the end node 311, 312, or 320 connected to the switch 310, as illustrated in FIG. 3. The switch 310 and the communication node may support the IEEE 802.3bp standard. Therefore, the switch 310 and the communication node may support the auto negotiation protocol defined in the IEEE 802.3bp standard.

Once the vehicle network is formed (e.g., when a power is applied to the vehicle network, or when a battery is connected to the vehicle network), the switch 310 (e.g., the PHY layer unit of the switch 310) may perform an auto negotiation with the counterpart communication node based on an auto negotiation protocol. Alternatively, the switch 310 may periodically perform the auto negotiation based on the auto negotiation protocol. In this case, the switch 310 (e.g., the PHY layer unit of in the switch 310) may detect a fault occurring in the link between the switch 310 and the communication node, and identify the type of the fault by monitoring a frame or a pulse signal transmitted from the communication node (S500). For example, the switch 310 may identify the types of the faults in the link between the ports P11 and P31, the link between the ports P12 and P41, the link between the ports P13 and P51, and the link between the ports P14 and P21.

The type of fault may include "unknown fault," "port fault in a local communication node," "port fault in a remote communication node," "link (or, cable) disconnection fault," and so on. With reference to the switch 310, the local communication node may be the switch 310 itself, and the remote communication node may be the end node 311, the end node 312, the end node 313, or the switch 320. The type of fault occurring in the link may be identified based on whether a frame or a pulse signal is received through the link, or whether a frame or a pulse signal is transmitted through the link. Various methods for identifying the type of fault in the link may exist without being restricted to the above example.

In a case that a port fault is identified in the local communication node, the switch 310 may reset the corresponding faulted port (e.g., the port P11, the port P12, the port P13, or the port P14). In a case that a port fault is identified in the remote communication node, the switch 310 may close its port connected to the faulted port of the remote communication node. Also, the switch 310 may identify the identifier (e.g., PHY address or MAC address) of the remote communication node having the faulted port. For example, the switch 310 may receive topology information of the vehicle network from an upper communication node while the vehicle network is being formed, and the topology information of the vehicle network may comprise connection relations among communication nodes constituting the vehicle network and identifiers of the communication nodes. Therefore, the switch 310 may identify the identifier of the communication node (e.g., the remote communication node) having the faulted port based on the topology information. In case that a disconnection of the link is identified, the switch 310 may close the port connected to the broken link.

Meanwhile, the communication node connected with the switch 310 may identify the type of fault in the link in the manner identical to or similar with the above-described manner. Also, when a port fault is identified in the local communication node, the communication node may reset the corresponding port. When a port fault is identified in the remote communication node, the communication node may close its port connected to the faulted port of the remote communication node. When a disconnection of the link is identified, the communication node may close its port connected to the broken link.

The switch 310 (e.g., the PHY layer unit of the switch 310) may generate a pulse signal including a base page (S510). The pulse signal may be a LIT pulse signal, a NLP signal, or a FLP signal, and may be encoded in a differential encoding manner. The base page may include capability information the switch 310 (e.g., transmission speeds and/or duplex modes supported by the switch 310). Also, the base page may include an indicator (hereinafter, referred to also as a "link fault type indicator") indicating type of fault occurring in a link. The link fault type indicator may be represented with reserved bits in the base page. For example, the link fault type indicator may be represented using 2 bits, and configured as shown in Table 1 below.

TABLE 1

| Bit values | Information |
|---|---|
| 00 | Unknown fault |
| 01 | Port fault in a local communication node |
| 10 | Port fault in a remote communication node |
| 11 | Disconnection in a link |

In a case that a port fault is detected in a remote communication node, the base page may further include an identifier of the communication node having the faulted port (i.e., the faulted remote communication node). The link fault type indicator may be mapped to the identifier of the faulted communication node. The base page may include indicators indicating types of faults occurring in respective links and identifiers mapped to the indicators.

The switch 310 (e.g., the PHY layer unit of the switch 310) may transmit the pulse signal to communication nodes (S520). The pulse signal may be transmitted in broadcast manner or multicast manner. Accordingly, the pulse signal may be transmitted to all communication nodes constituting the vehicle network, and all the communication nodes may identify the information included in the pulse signal.

A communication node (e.g., a PHY layer unit of the communication node) may receive the pulse signal from the switch 310. The communication node may identify the transmission speeds and/or duplex modes supported by the switch 310 based on the capability information included in the pulse signal, and determine common transmission parameters based on the identified transmission speeds and/or duplex modes. For example, identically to or similarly with the step S420 explained with reference to FIG. 4, among transmission speeds supported by the switch 310 and transmission speeds supported by the communication node, the highest common transmission speed may be determined as the common transmission parameter. Also, in a case that both of the full-duplex mode and the half-duplex mode are supported by the switch 310 and the communication node, the full-duplex mode may be determined as the common transmission parameter. Also, in a case that both of the full-duplex mode and the half-duplex mode are supported by the switch 310 and only the half-duplex mode is supported by the communication node, the half-duplex mode may be determined as the common transmission parameter.

Also, the communication node may obtain the link fault type indicator from the pulse signal. The communication node may identify that an unknown fault has occurred from the link fault type indicator configured as '00'. The communication node may identify that a port fault has occurred in a local communication node (e.g., the switch 310) from the link fault type indicator configured as '01'. The communication node may identify that a port fault has occurred in a remote communication node (e.g., the end node 311, end node 312, end node 313, end node 320, etc.) from the link fault type indicator configure as '10'. The communication node may identify that a break exists in the link from the link fault type indicator configured as '11'. Also, the communication node may obtain the identifier of the faulted communication node from the pulse signal. The communication node may identify which communication node is the faulted communication node, based on the identifier.

The communication node may generate a pulse signal identically to or similarly with the step S510. The base page of the pulse signal may include capability information of the communication node (e.g., transmission speeds and/or duplex modes supported by the communication node). Also, the pulse signal may further include the link fault type indicator, an identifier of the faulted communication node, etc. The communication node may transmit the pulse signal in broadcast manner or in multicast manner.

In the link status diagnostic method explained with reference to FIG. 5, the link fault type indicator is notified using the pulse signal including the base page. However, in a link status diagnostic method which will be explained in the below, the link fault type indicator may be notified by using both of a pulse signal including a base page and a pulse signal including a next page.

Figure 6:
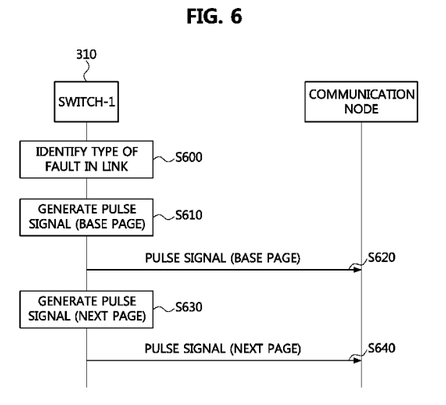
FIG. 6 is a sequence chart illustrating an auto negotiation protocol based method for diagnosing a link status according to a second exemplary embodiment of the present disclosure.

FIG. 6 is a sequence chart illustrating an auto negotiation protocol based method for diagnosing a link status according to a second exemplary embodiment of the present disclosure.

As shown in FIG. 6, the switch 310 and the communication node may constitute the vehicle network illustrated in FIG. 3. The switch 310 may be identical to or similar with the switch 310 illustrated in FIG. 3. The communication node may be the end node 311, end node 312, end node 313, or switch 320 which is connected with the switch 310. The switch 310 and the communication may support the IEEE 802.3bp standard. Thus, the switch 310 and the communication node may support the auto negotiation protocol defined according to the IEEE 802.3bp standard.

Once the vehicle network is formed (e.g., when a power is applied to the vehicle network, or when a battery is connected to the vehicle network), the switch 310 (e.g., the PHY layer unit of the switch 310) may perform an auto negotiation with the communication node based on the auto negotiation protocol. Alternatively, the switch 310 may periodically perform the auto negotiation based on the auto negotiation protocol. In this case, the switch 310 (e.g., the PHY layer unit of the switch 310) may detect a fault occurring in the link, and identify the type of fault by monitoring a frame or a pulse signal transmitted from the communication node (S600). For example, the switch 310 may identify the types of faults occurring in the link between the ports P11 and P31, the link between the ports P12 and P41, the link between the ports P13 and P51, and the link between the ports P14 and P21.

The type of fault may include "unknown fault," "port fault in a local communication node," "port fault in a remote communication node," "link (or cable) disconnection fault," and so on. In a case that a port fault is identified in the local communication node, the switch 310 may reset the corresponding faulted port (e.g., the port P11, the port P12, the port P13, or the port P14). In a case that a port fault is identified in the remote communication node, the switch 310 may close its port connected to the faulted port of the remote communication node. Also, the switch 310 may identify the identifier (e.g., PHY address or MAC address) of the remote communication node having the faulted port. In case that a disconnection of the link is identified, the switch 310 may close the port connected to the broken link.

Meanwhile, the communication node connected with the switch 310 may identify the type of fault occurring in the link in the manner identical to or similar with the above-described manner. Also, when a port fault is identified in the local communication node, the communication node may reset the corresponding port. When a port fault is identified in the remote communication node, the communication node may close its port connected to the faulted port of the remote communication node. When a disconnection of the link is identified, the communication node may close its port connected to the broken link.

The switch 310 (e.g., the PHY layer unit of the switch 310) may generate a pulse signal including a base page (S510). The pulse signal may be a LIT pulse signal, a NLP signal, or a FLP signal, and may be encoded in a differential encoding manner. The base page may include capability information of the switch 310 (e.g., transmission speeds and/or duplex modes supported by the switch 310). When a fault occurring in the link is detected, a remote fault field of the base page may indicate that the fault has been detected in the link, and a next page field of the base page may indicate that the next page exists (e.g., indicate that a pulse signal including the next page is to be transmitted). The switch 310 may notify that the pulse signal including the next page comprising the link fault type indicator is to be transmitted, by configuring the remote field and the next page field in the above-described manner.

Here, the remote fault field configured as '0' may indicate that a fault has not been detected in the link, and the remote fault field configured as '1' may indicate that a fault has been detected in the link. The next page field configured as '0' may indicate that a next page does not exist, and the next page field configured as '1' may indicate that a next page exists.

The switch 310 (e.g., the PHY layer unit of the switch 310) may transmit the pulse signal including the base page to the communication node (S620). The pulse signal may be transmitted in broadcast manner or multicast manner. Thus, the pulse signal may be transmitted to all the communication nodes constituting the vehicle network. The communication node (e.g., the PHY layer unit of the communication node) may receive the pulse signal from the switch 310. The communication node may identify transmission speeds, duplex modes, etc. supported by the switch 310 based on the capability information included in the pulse signal, and determined common transmission parameters based on the identified transmission speeds, duplex modes, etc. Also, since the remote fault field in the base page included in the pulse signal indicates that the fault has been detected in the link, and the next page field indicates that the next page exists, the communication node may identify that the pulse signal including the next page comprising the link fault type indicator is to be transmitted.

Meanwhile, the switch 310 (e.g., the PHY layer unit of the switch 310) may generate the pulse signal including the next page (S630). The pulse signal may be a LIT pulse signal, a NLP signal, or a FLP signal, and may be encoded in a differential encoding manner. The next page may include the link fault type indicator. The link fault type indicator may be configured as shown in the table 1. In the case that the type of fault occurring in the link is a port fault of a remote communication node, the next page may further include an identifier of a communication node (e.g., the remote communication node) having a faulted port. The link fault type indicator may be mapped to the identifier of the faulted communication node. The base page may comprise indicators indicating types of faults occurring in a plurality of links, and identifiers mapped to the indicators.

The switch 310 (e.g., the PHY layer unit of the switch 310) may transmit the pulse signal including the next page to the communication node (S640). The pulse signal may be transmitted in broadcast manner or multicast manner. Thus, the pulse signal may be transmitted to all the communication nodes constituting the vehicle network. The communication node (e.g., the PHY layer unit of the communication node) may receive the pulse signal including the next page from the switch 310. The communication node may obtain the link fault type indicator from the pulse signal. The communication node may identify that an unknown fault has occurred from the link fault type indicator configured as '00'. The communication node may identify that a port fault has occurred in a local communication node from the link fault type indicator configured as '01'. The communication node may identify that a port fault has occurred in a remote communication node from the link fault type indicator configure as '10'. The communication node may identify that a break exists in the link from the link fault type indicator configured as '11'.

The communication node (e.g., the PHY layer unit of the communication node) may generate a pulse signal including a base page identically to or similarly with the step S610, and transmit the pulse signal identically to or similarly with the step S620. The base page of the pulse signal may comprise capability information of the communication node, a remote fault field, a next page field, etc. Also, the communication node (e.g., the PHY layer unit of the communication node) may generate a pulse signal including a next page identically to or similarly with the step S630, and transmit the pulse signal identically to or similarly with the step S640. The next page of the pulse signal may include the link fault type indicator, the identifier of the communication node connected to the faulted port, etc.

In the above description, the link fault type indicator and the identifier of the faulted communication node are described as included in the next page. However, the link fault type indicator may be included in the base page, and the identifier of the faulted communication node may be included in the next page. Alternatively, the link fault type indicator may be included in the next page, and the identifier of the faulted communication node may be included in the base page.

In the methods for diagnosing a link status, explained with reference to FIGS. 5 and 6, the link fault type indicator is notified using the pulse signal including the base page. In the below link status diagnosing method, fault state information of the link may be notified via a MAC frame.

Figure 7:
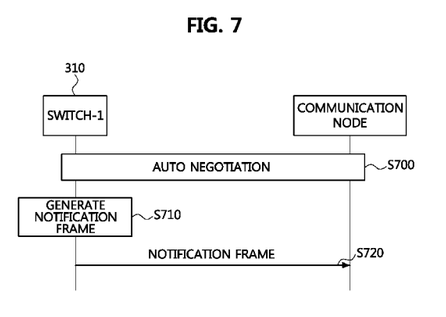
FIG. 7 is a sequence chart illustrating an auto negotiation protocol based method for diagnosing a link status according to a third exemplary embodiment of the present disclosure.

FIG. 7 is a sequence chart illustrating an auto negotiation protocol based method for diagnosing a link status according to a third exemplary embodiment of the present disclosure.

As shown in FIG. 7, the switch 310 and the communication node may constitute the vehicle network illustrated in FIG. 3. The switch 310 may be identical to or similar with the switch 310 illustrated in FIG. 3. The communication node may be the end node 311, end node 312, end node 313, or switch 320 which is connected with the switch 310. The switch 310 and the communication may support the IEEE 802.3bp standard. Thus, the switch 310 and the communication node may support the auto negotiation protocol defined according to the IEEE 802.3bp standard. In this case, each of the switch 310 and the communication may comprise an auto negotiation sublayer.

Once the vehicle network is being formed (e.g., when a power is applied to the vehicle network, or when a battery is connected to the vehicle network), the switch 310 (e.g., the PHY layer unit of the switch 310) may perform an auto negotiation with the communication node based on the auto negotiation protocol (S700). Alternatively, the switch 310 may periodically perform the auto negotiation based on the auto negotiation protocol. The auto negotiation may be performed identically to or similarly with the steps S400 to S420 explained with reference to FIG. 4. In the auto negotiation, the switch 310 may detect a fault in the link, and identify the type of the fault by monitoring a frame or a pulse signal transmitted from the communication node. For example, the switch 310 may identify the types of faults occurring in the link between the ports P11 and P31, the link between the ports P12 and P41, the link between the ports P13 and P51, and the link between the ports P14 and P21.

The type of the fault may include "unknown fault", "port fault in a local communication node," "port fault in a remote communication node," "link (or cable) disconnection fault," and so on. In a case that a port fault is identified in the local communication node, the switch 310 may reset the corresponding faulted port (e.g., the port P11, the port P12, the port P13, or the port P14). In a case that a port fault is identified in the remote communication node, the switch 310 may close its port connected to the faulted port of the remote communication node. Also, the switch 310 may identify the identifier (e.g., PHY address or MAC address) of the remote communication node having the faulted port. In case that a disconnection of the link is identified, the switch 310 may close the port connected to the broken link. The switch 310 (e.g., the MAC layer unit included in the switch 310) may generate a notification frame including an indicator indicating type of fault in the link (S710). The notification frame may be a MAC frame, and configured as follows.

Figure 8:
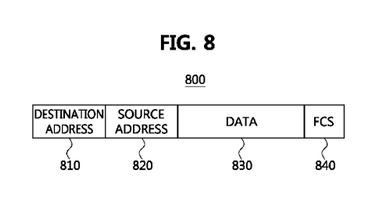
FIG. 8 is a block diagram illustrating an example of a notification frame according to embodiments of the present disclosure.

FIG. 8 is a block diagram illustrating an example of a notification frame according to embodiments of the present disclosure.

As shown in FIG. 8, a notification frame 800 may comprise a destination address field 810, a source address field 820, a data field 830, and a frame check sequence (FCS) field 840. The destination address field 810 may be configured for broadcast transmission or multicast transmission. The source address field 820 may be configured as the identifier (e.g., PHY address or MAC address) of the switch 310. The data field 830 may include an indicator indicating type of fault in a link (referred to as "link fault type indicator"). The indicator may have the length of 2 bits. For example, the values of the indicator may be configured as shown in the table 1.

Also, the data field 830 may further include an identifier (e.g., PHY address and/or MAC address) of the communication node connected to the faulted link. The link fault type indicator may be mapped to the identifier of the communication node in the faulted state. The data field 830 may include an indicator indicating respective types of faults in a plurality of links and identifiers mapped to the indicator. Also, the data field 830 may further include an indicator indicating auto negotiation result. The indicator indicating the auto negotiation result may indicate auto negotiation results for respective links. For example, the indicator configured as '0' may indicate that the auto negotiation has been completed, and the indicator configured as '1' may indicate that the auto negotiation has been failed.

Referring once again to FIG. 7, the switch 310 may transmit the notification frame in broadcast manner or multicast manner (S720). Thus, the notification frame may be transmitted to all communication nodes constituting the vehicle network. The communication node (e.g., the MAC layer unit of the communication node) may receive the notification frame from the switch 310. The communication node may identify the type of fault occurring in the link based on the link fault type indicator included in the notification frame, and identify the faulted communication node based on the identifier of the faulted communication node included in the notification frame. Also, the communication node may identify the auto negotiation result (e.g., completion or failure of the auto negotiation) based on the indicator indicating the auto negotiation result included in the notification frame.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While embodiments of the present disclosure and their advantages have been described in detail above, it should be understood that various changes, substitutions and alterations may be made herein without departing from the scope of the disclosure.

What is claimed is:

1. A method for diagnosing a link status, performed in a first communication node of an Ethernet-based vehicle network, the method comprising:
   identifying, by the first communication node, a type of a fault occurring in a link connected to the first communication node by monitoring a frame or a pulse signal transmitted from a second communication node connected to the link, wherein the type of the fault is one of a port fault in a local communication node, a port fault in a remote communication node, and a link disconnection fault;
   generating, by the first communication node, a first pulse signal including capability information which indicates at least one of transmission speeds and supported duplex modes of the first communication node and further including a link fault type indicator indicating the type of the fault; and
   transmitting, by the first communication node, the first pulse signal,
   wherein the first pulse signal is generated and transmitted according to an auto negotiation protocol.

2. The method according to claim 1, wherein the first signal further includes a base page in which the link fault type indicator is included.

3. The method according to claim 1, wherein the first signal further includes an identifier of the second communication node in which the fault occurs.

4. The method according to claim 3, wherein the identifier includes at least one of a physical address and a medium access control (MAC) address of the second communication node.

5. The method according to claim 1, further comprising resetting a port of the first communication node when the type of the fault occurring in the first communication node is the port fault in the local communication node.

6. The method according to claim 1, wherein the signal is transmitted in a broadcast manner.

7. The method according to claim 1, further comprising:
   closing a port of the first communication node connected to a faulted port of the second communication node when the type of the fault occurring in the first communication node is the port fault in the remote communication node.

8. The method according to claim 1, further comprising: closing a port of the first communication node connected to a disconnected link between the first communication node and the second communication node when the type of the fault occurring in the first communication node is the link disconnection fault.

9. A method for diagnosing a link status, performed in a first communication node of an Ethernet-based vehicle network, the method comprising:
identifying, by the first communication node, a type of a fault occurring in a link connected to the first communication node by monitoring a frame or a pulse signal transmitted from a second communication node connected to the link, wherein the type of the fault is one of a port fault in a local communication node, a port fault in a remote communication node, and a link disconnection fault;
transmitting, by the first communication node, a first pulse signal including capability information which indicates at least one of transmission speeds and supported duplex modes of the first communication node and further including a first indicator indicating an existence of the link in which the fault occurs; and
transmitting, by the first communication node, a second pulse signal including a second indicator indicating the type of the fault,
wherein the first pulse signal and the second pulse signal are transmitted according to an auto negotiation protocol.

10. The method according to claim 9 wherein the first signal further includes a base page in which the first indicator is included.

11. The method according to claim 9, wherein each of the first signal and the second signal is a pulse signal, the first signal further includes a third indicator indicating transmission of the second signal, and the second signal further includes a next page.

12. The method according to claim 9, wherein the second signal is a pulse signal, and the second signal further includes a next page in which the second indicator is included.

13. The method according to claim 9, wherein the second signal further includes an identifier of the second communication node in which the fault occurs.

14. A method for diagnosing a link status, performed in a first communication node of an Ethernet-based vehicle network, the method comprising:
identifying, by the first communication node, a type of a fault occurring in a link connected to the first communication node by monitoring a frame or a pulse signal transmitted from a second communication node connected to the link, wherein the type of the fault is one of a port fault in a local communication node, a port fault in a remote communication node, and a link disconnection fault;
generating, by the first communication node, a first pulse signal including a capability information which indicates at least one of transmission speeds and supported duplex modes of the first communication node;
transmitting the first pulse signal;
generating, by the first communication node, a medium access control (MAC) frame including a first indicator indicating the type of the fault; and
transmitting the MAC frame,
wherein the first pulse signal is transmitted according to the auto negotiation protocol.

15. The method according to claim 14, wherein the MAC frame further includes an identifier of the second communication node in which the fault occurs.

16. The method according to claim 14, wherein the MAC frame further includes a second indicator indicating a result of the auto negotiation procedure.

17. The method according to claim 14, wherein the MAC frame is transmitted in a broadcast manner.

* * * * *